United States Patent [19]

Werner et al.

[11] Patent Number: 5,895,205
[45] Date of Patent: Apr. 20, 1999

[54] METHOD FOR REPAIRING PARTITIONS OF A TURBINE DIAPHRAGM

[75] Inventors: Dennis John Werner, Richardson, Tex.; Stephen Roger Johnson, Saratoga Springs; Ralph A. Pollock, Ballston Lake, both of N.Y.

[73] Assignee: General Electric Co., Schenectady, N.Y.

[21] Appl. No.: 08/857,748

[22] Filed: May 16, 1997

Related U.S. Application Data

[62] Division of application No. 08/511,814, Aug. 7, 1995.
[51] Int. Cl.⁶ .................... F01D 1/02; F03B 1/00; F04D 29/44
[52] U.S. Cl. .................... 415/210.1; 415/208.4; 415/209.4
[58] Field of Search .................... 415/12, 200, 208.1, 415/208.2, 208.4, 209.2, 209.3, 209.4, 210.1

[56] References Cited

U.S. PATENT DOCUMENTS

| | | | |
|---|---|---|---|
| 3,215,511 | 11/1965 | Chisholm et al. | 415/200 |
| 3,650,635 | 3/1972 | Wachtell et al. | 415/208.1 X |
| 4,026,659 | 5/1977 | Freeman, Jr. | 416/97 R X |
| 5,062,205 | 11/1991 | Fraser | 29/889.7 |
| 5,358,379 | 10/1994 | Pepperman et al. | 416/224 X |

Primary Examiner—John E. Ryznic
Attorney, Agent, or Firm—Nixon & Vanderhye

[57] ABSTRACT

The repair method includes removing eroded or damaged trailing edge portions of partitions in the diaphragm of a turbine, over 50% of the length of the partitions being removed commencing at the trailing edge. A coupon which is a precise replication of a portion of an originally specified partition is welded to the remaining or extant partition portion by a seal weld along the radial length of the coupon on the suction side of the repaired partition and two full penetration welds at the ends of the coupon to secure it to the inner and outer rings or side walls of the diaphragm. The repaired partition is thus substantially identically contoured as the original partition.

7 Claims, 5 Drawing Sheets

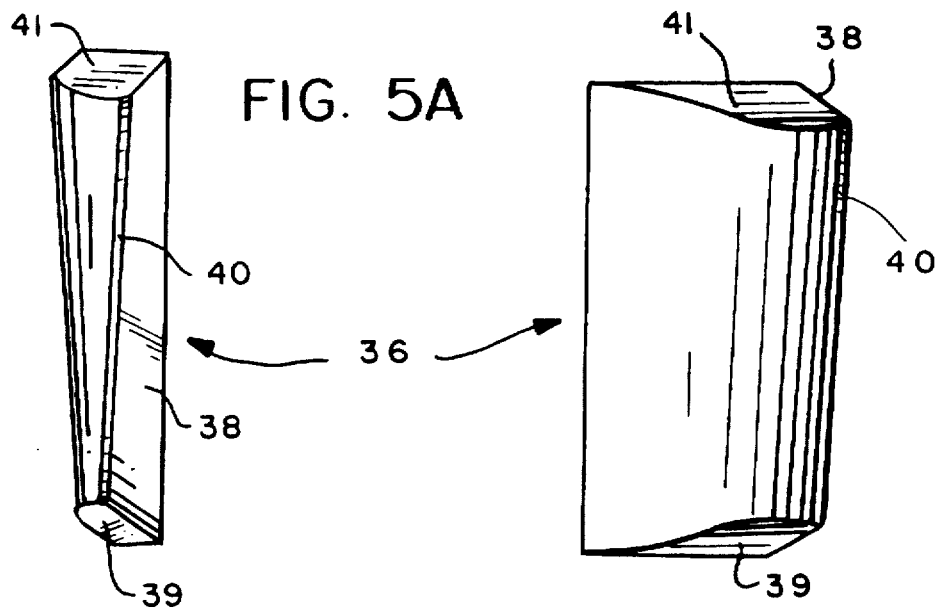
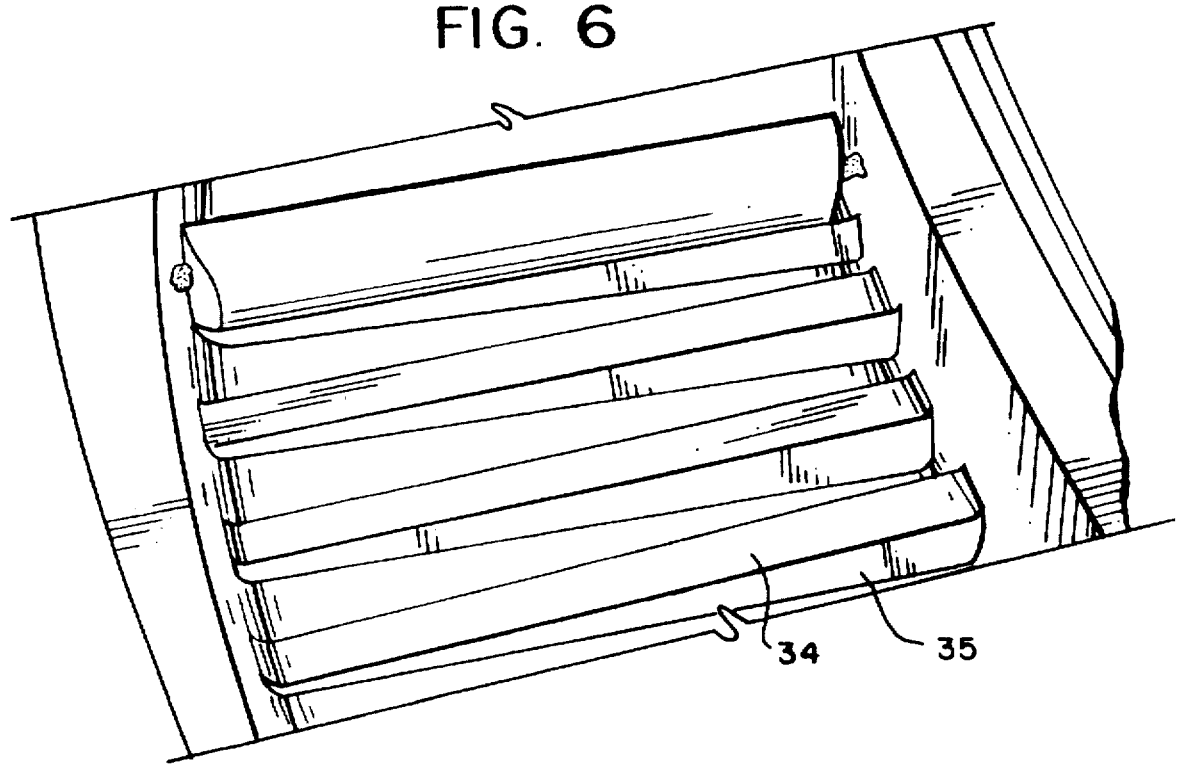

METHOD FOR REPAIRING PARTITIONS OF A TURBINE DIAPHRAGM

This is a divisional of co-pending application Ser. No. 08/511,814, filed Aug. 7, 1995.

TECHNICAL FIELD

The present invention relates to diaphragms for turbines and particularly to methods for repairing partitions, for example, of a steam turbine diaphragm.

BACKGROUND

Partitions used in the diaphragms of turbines, particularly steam turbines, erode over time due to extended use. The erosion occurs principally along trailing edge portions of the partitions and causes loss of performance. It has been the practice in the industry to repair the partitions rather than to effect their replacement or to replace the entire diaphragm. A prior method of repairing steam turbine diaphragms included grinding back the eroded partition, i.e., grinding away trailing edge portions of the partitions, then applying weld material over a copper chill and hand-contouring the weld material by grinding with die grinders. Particularly, the eroded or damaged partition was cut back or ground along the trailing edge until a good parent material became available. The cutback of the original material was typically on the order of 15–25% of the length of the partition from the trailing edge, e.g., as measured along the chord of the partition from its trailing edge to its leading edge. It will be appreciated that the cutbacks or material ground from each partition varied from partition to partition. A thin piece of copper was used as a chill and placed under the area to be welded. Weld material, for example, stainless steel, was then applied to the existing partition. Following the welding, the partitions were ground by hand using burrs and power files to contour each partition by hand back to an approximation of the contours of the original partition. Contouring the pressure side of each partition was a particular problem because of the small entrance opening between adjacent partitions limiting access to the pressure side. Consequently, a small burr grinder was typically used to grind the high spots on the pressure side. However, the pressure side could not be ground precisely to the contour of the original partition but only to a rough approximation thereof, while the suction side could be ground more accurately to the contour of the original partition. Moreover, because the grinding and contouring was performed manually, variations from partition to partition existed even after the repair was complete. It will also be appreciated that this method was time consuming, highly labor intensive because the welds were manually applied and contoured by hand grinding, and oftentimes did not elevate the performance of the diaphragm to its original designed performance.

Subsequently, a method of installing a "similar to" trailing edge section of the partition was adopted. In this method, the partitions were ground back similarly as previously discussed and oftentimes slightly further along the chord, i.e., about 30%. "Coupons" were provided which were similar to the removed trailing edge portions. That is, the coupons were provided in a number of different styles or sizes and frequently did not fit a particular partition perfectly. Problems were encountered with the fit of the coupon to the parent partition because the coupon was not an exact contour of the parent partition and the coupon was often angularly misaligned relative to the parent partition. The coupon required a full penetration weld along its radial length and, following the welding, the partition was hand contoured and stress relieved. Again, however, the hand contouring did not exactly replicate the contour of the original partition.

Later, a further method using an exactly contoured partial partition, i.e., coupon, was installed. Here, the coupon was a precise replication of the trailing edge portion of the original partition up to about 20–30% of the length of the partition, e.g., along its chord. Fit up problems, however, remained similarly as with prior coupons. A full penetration weld was believed necessary to secure the exactly contoured coupon to the remaining portion of the original partition. Because of this, distortion of the trailing edge coupon was encountered and which was a result of the high heat input required by the full penetration weld performed along the radial joint between the coupon and original partition portion. That is, the exactly contoured trailing edge coupon absorbed sufficient heat during application of the full penetration weld along its forward radius such that it would twist and distort during setting necessitating subsequent further grinding and, in large part, defeating the purpose of a trailing edge coupon contoured precisely according to a portion of the original partition.

DISCLOSURE OF THE INVENTION

The method according to the present invention eliminates the heretofore believed necessity of applying a full penetration weld along the radial length of the coupon when joining it to the remaining portion of the original partition, hence avoiding distortion or twisting of the coupon when secured to the remaining original partition portion. In the present invention, full penetration welds are employed only to join the opposite radial end faces of the coupon to the inner and outer rings or sidewalls of the diaphragm. Only a seal weld is applied across the radial juncture of the remaining partition portion and the coupon and then only on the suction side of the partition. Additionally, the present invention employs a coupon contoured exactly according to the contour of a portion of the originally specified partition and which coupon has a length in excess of 50% of the length of the original partition, e.g., as measured along its chord. The exactly contoured coupon of the present invention has a length ranging from between 50%–85% of the length of the original partition. Consequently, the extant partition or partition undergoing repair is cut back, machined, or ground to leave a leading edge portion of the original partition having a length of 15–50% of the original partition as measured from its leading edge. That is, 50–85% of the extant partition is cut back, machined, or ground away to leave a leading edge portion thereof having a length corresponding exactly to the difference in lengths between the originally specified partition and the coupon. Hence, the contours of the repaired partition correspond identically to the contours of the originally specified partition.

The present repair method also affords an efficiency gain by recovering previously non-recoverable performance losses due to the previous inability to contour the repaired partition exactly and repeatably as each partition is repaired. Moreover, the reduction in welding by requiring only full penetration welds at the opposite radial ends of the partition and a seal weld along its radial extent and along only one side of the partition substantially reduces the involved labor in comparison with the above-discussed prior methods.

The advantages of the method of repair according to the present invention include: (a) substantially exact restoration of the pressure side of the partition which previously could not be contoured exactly to the contour of the pressure side of the original partition; (b) recovery of losses approximating 1–3% per stage due to the ability to provide exactly contoured repaired partitions; (c) faster repair with less welding and grinding; (d) enabling ready and easy restoration of side wall erosion (that is, the side walls or rings mounting the partitions are more readily repaired by welding); (e) restoration of the partition is within 2% of the design of the original partition; and (f) substantial reduction in the cost of the repair.

In a preferred embodiment according to the present invention, there is provided a method of repairing a partition of a turbine diaphragm comprising the steps of (a) providing a coupon replicating a portion of an originally specified partition for the turbine diaphragm, the coupon having a trailing edge and a length extending from the trailing edge in excess of 50% of the length of the originally specified partition, (b) removing a portion of an extant partition in the turbine diaphragm extending from a trailing edge thereof and leaving a leading edge portion thereof having a length corresponding to the difference in lengths between the originally specified partition and the coupon, (c) locating the coupon in the diaphragm adjacent the leading edge portion and (d) securing the coupon to the diaphragm including forming a seal weld between the coupon and the leading edge portion to form a repaired partition, the seal weld lying along a suction side of the repaired partition.

In a further preferred embodiment according to the present invention, there is provided a method of repairing a partition of a turbine diaphragm comprising the steps of (a) providing a coupon replicating a portion of an originally specified partition for the turbine diaphragm, the coupon having a trailing edge and a length extending from the trailing edge in excess of 50% of the length of the originally specified partition, (b) removing a portion of an extant partition in the turbine diaphragm having a length extending from a trailing edge thereof corresponding to the length of the coupon and leaving a leading edge portion of the extant partition in the diaphragm, (c) locating the coupon in the diaphragm adjacent the leading edge portion and (d) securing the coupon to the diaphragm including forming a seal weld between the coupon and the leading edge portion to form a repaired partition, the seal weld lying solely along one side of the repaired partition.

Accordingly, it is a primary object of the present invention to provide a novel and improved method for repairing the partitions of a diaphragm in a turbine in which the repaired partitions obtain substantially the identical contour as the original partitions whereby efficiency losses are reduced and recovered and the time and cost of the repair are minimized.

BRIEF DESCRIPTION OF THE DRAWINGS

FIGS. 5A and 5B are perspective views of a coupon exactly contoured to the contour of an originally specified portion of the partition and which coupon is used in the repair;

FIG. 6 is a view similar to FIG. 3 illustrating an initial application of the coupon to the remaining leading edge portion of the original partition;

BEST MODE FOR CARRYING OUT THE INVENTION

Figure 1:
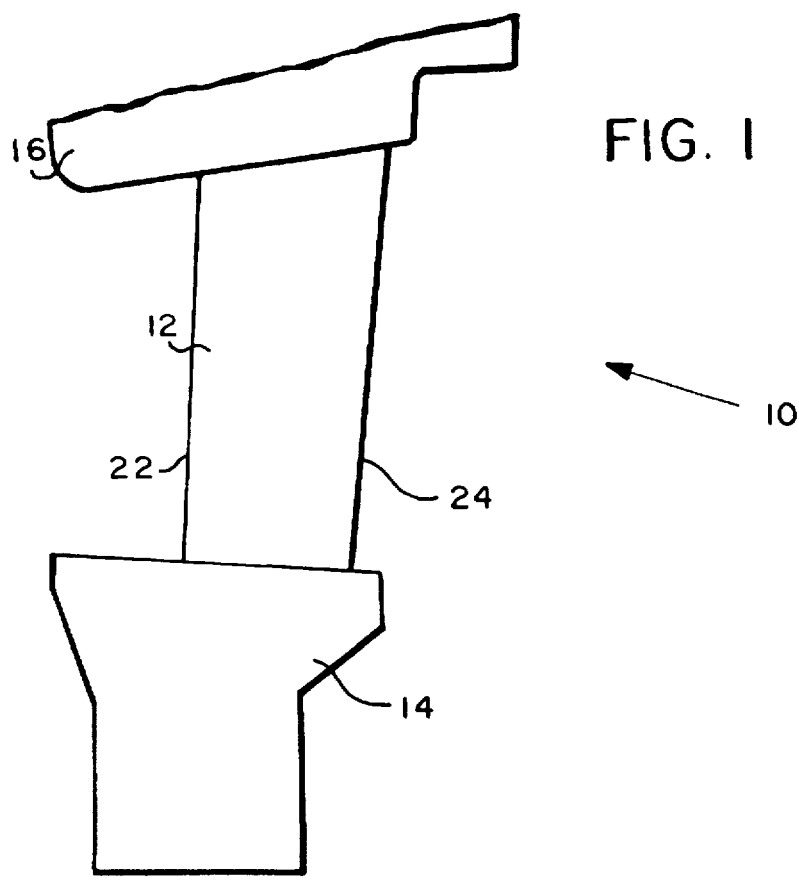
FIG. 1 is a schematic side elevational view illustrating a partition between opposite side walls in a diaphragm for a turbine.
Figure 2:
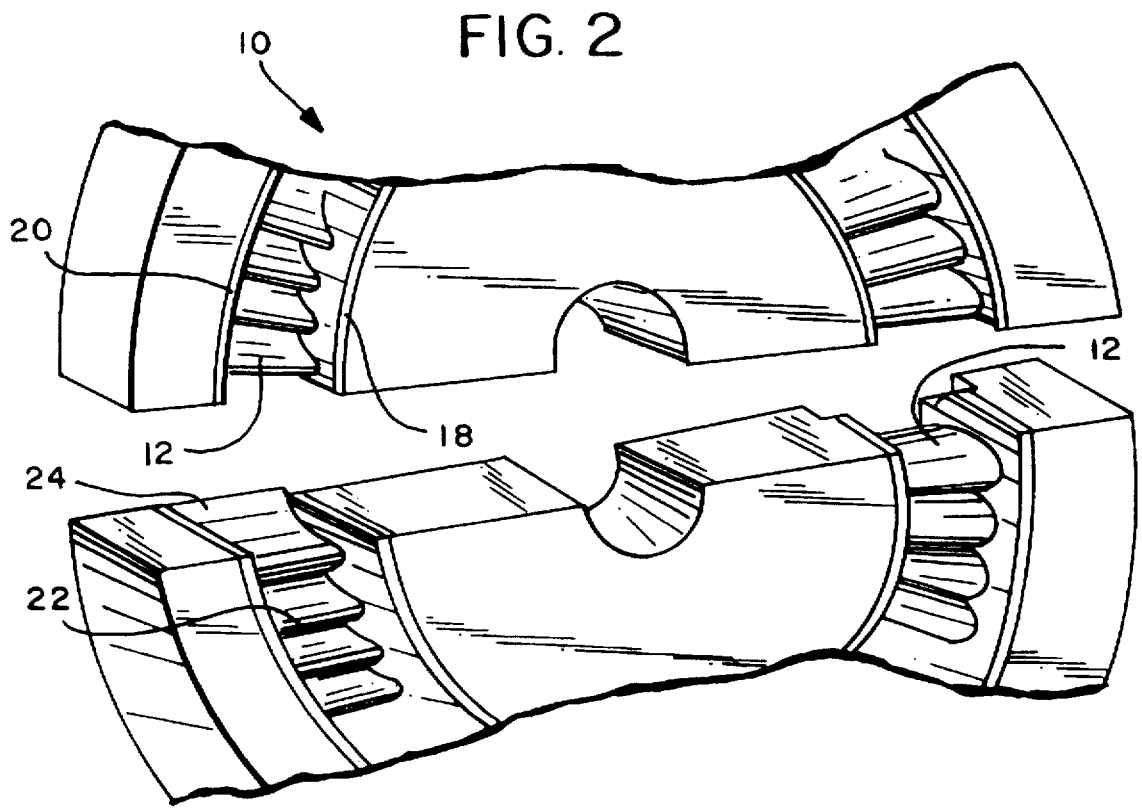
FIG. 2 is a fragmentary perspective view of the opposed halves of a turbine diaphragm.

Referring now to the drawings, particularly to FIGS. 1 and 2, there is illustrated a portion of a diaphragm, generally designated 10, for use in turbines and including a plurality of partitions or stator blades 12 interposed between inner and outer side walls 14 and 16 of diaphragm 10. The side walls may have inner and outer bands or rings, for example as illustrated at 18 and 20, respectively, in FIG. 2. The diaphragms are generally provided in cylindrical halves for ease of manufacture and installation as illustrated in FIG. 2. It will be appreciated that the partitions 12 are closely spaced relative to one another, extend generally along radii of the diaphragm and have leading and trailing edges 22 and 24, respectively. As noted previously, the trailing edges erode and pit over time with use, particularly in steam turbines, whereby significant performance losses occur absent repair or replacement of the partitions. Replacement of the partitions with wholly new partitions is not economically justified because repairs can be effected, particularly in accordance with the present method at a small percentage of the replacement cost.

In general, the present repair method involves removing approximately 50–85% of the length of the damaged extant partition as measured along the chord of the partition commencing at the trailing edge 24 and replacing the removed portion with a partition section or coupon having pressure and suction side contours exactly replicating the corresponding contours of the undamaged original partition. The extent of the leading edge portion of each partition remaining in the diaphragm is thus identical to one another, enabling identical coupons exactly replicating identically specified portions of the original partition to be used for repairing all of the partitions for a given diaphragm. Stated differently, identical coupons are provided replicating a portion of the originally specified partition and extend from a trailing edge thereof in excess of 50% of the length of the originally specified partition. The removed portion of the partition in the diaphragm leaves a leading edge portion in the diaphragm having a length corresponding to the difference in lengths between the originally specified partition and the coupon. Each coupon is welded by full penetration welds at its opposite radial end faces to the inner and outer rings or inner and outer sidewalls and is provided with a radial seal weld along the suction side of the repaired partition along the joint line between the remaining original partition and the coupon. In this manner, a substantially exact replication of the pressure and suction side contours of each original partition and repeatable for all partitions of the diaphragm is achieved.

Figure 3:
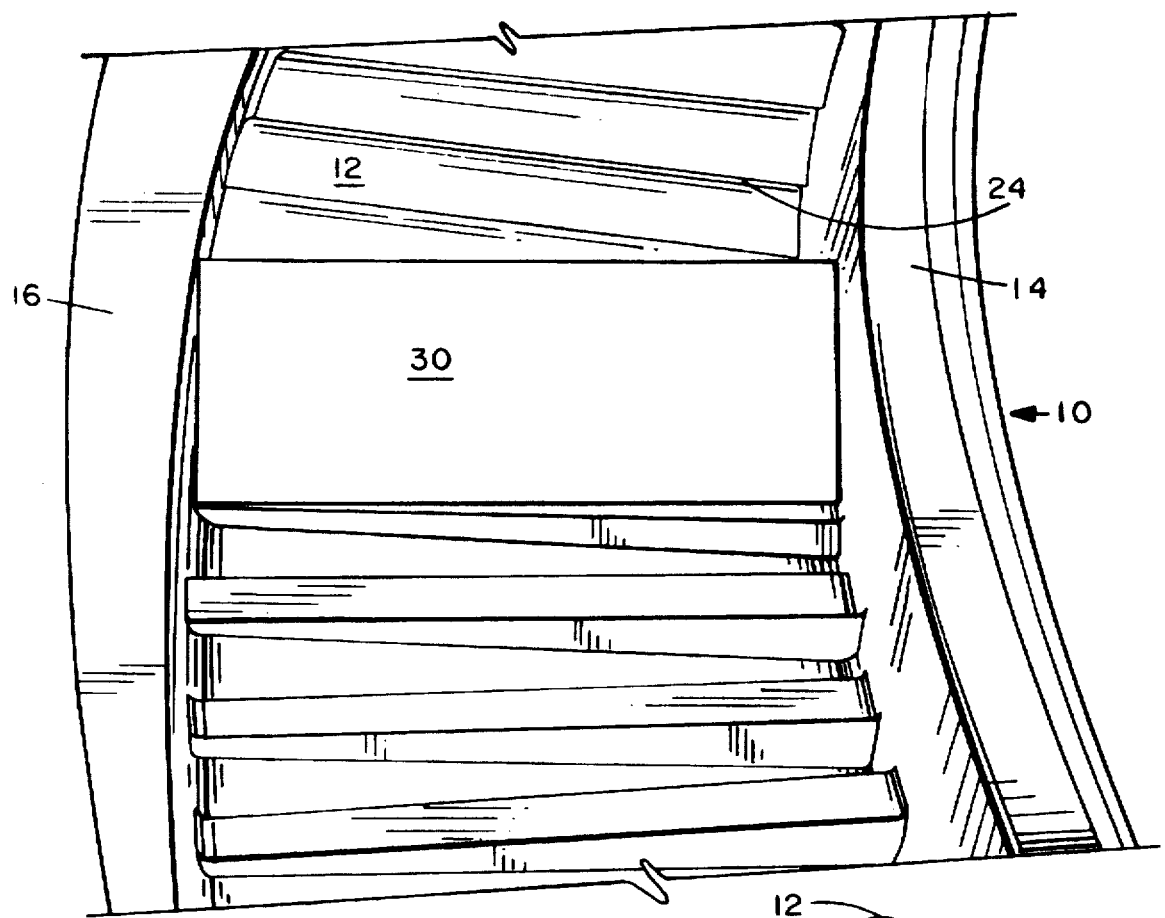
FIG. 3 is a perspective view schematically illustrating the removal of over 50% of the partition by a milling machine.
Figure 4:
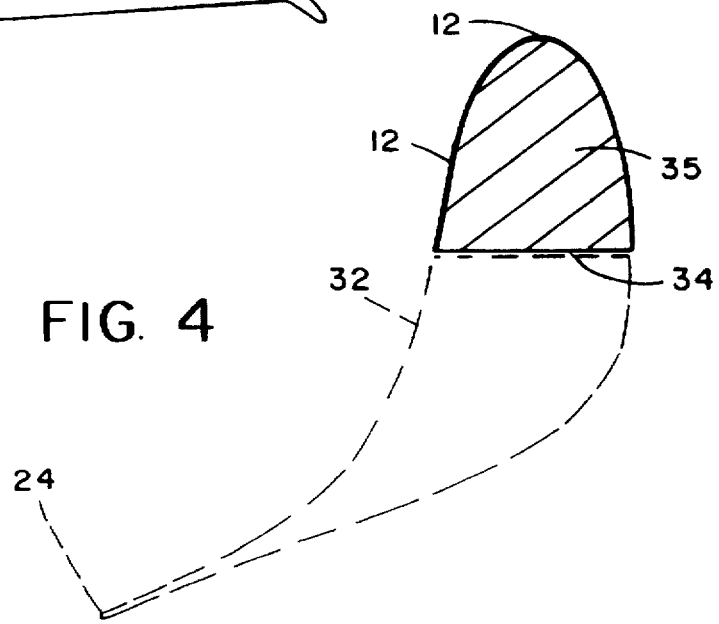
FIG. 4 is a cross sectional view illustrating the remaining leading edge portion of the original partition with the removed portion illustrated by dashed lines.
Figure 7:
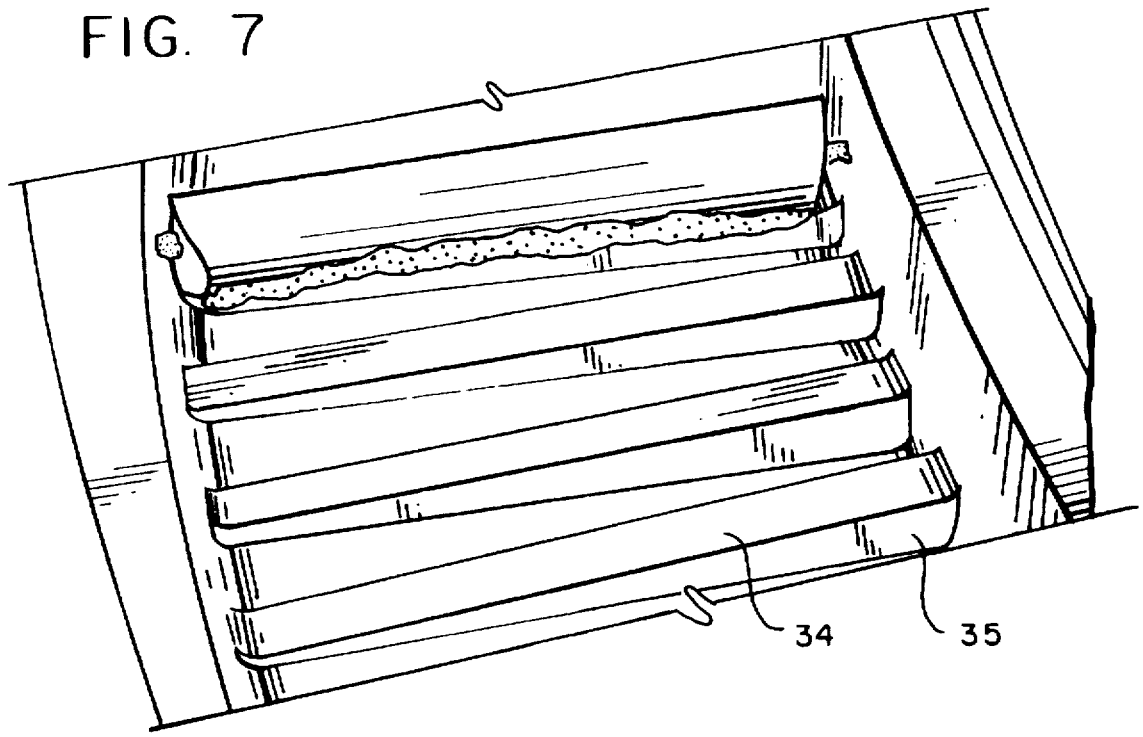
FIGS. 7–8 are views similar to FIG. 6 illustrating application of a radial seal weld and full penetration welds at the opposite ends of the repair coupon.
Figure 8:
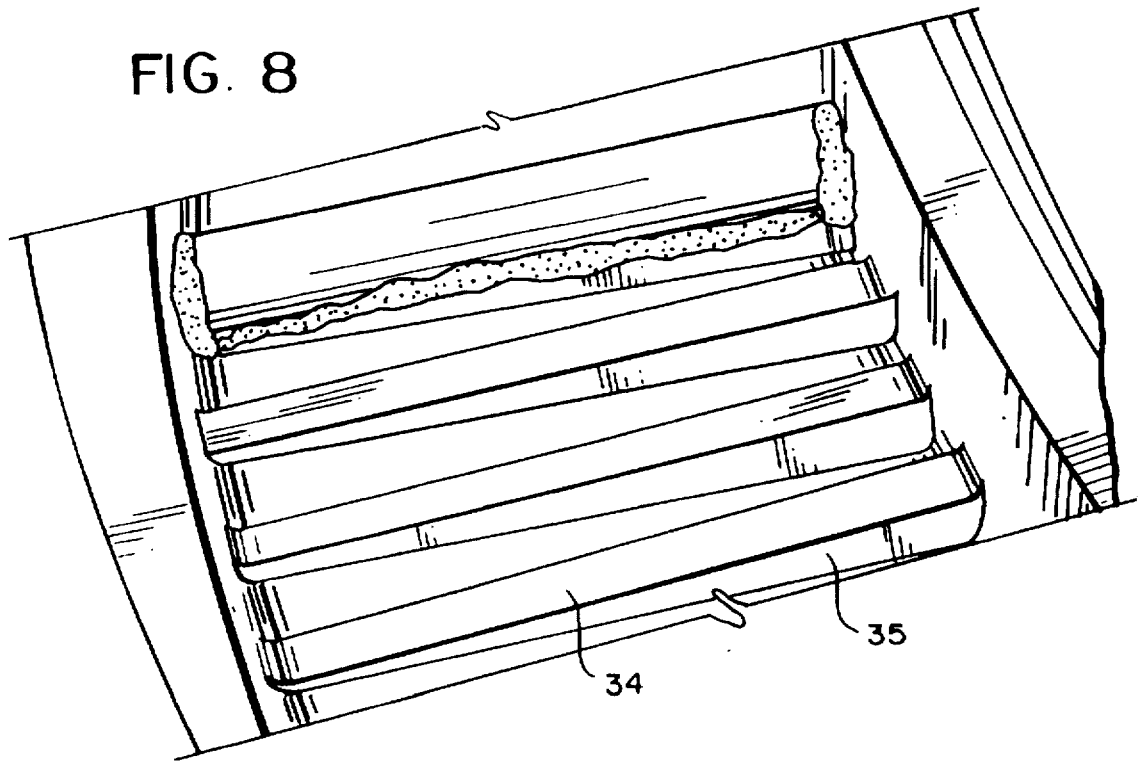

Particularly, and referring to FIG. 3, the diaphragm 10 undergoing repair is set up in a milling machine with a milling head schematically and generally designated 30. The diaphragm 10 may be mounted on a rotary table and rotated under the milling head 30 such that a majority of the partitions commencing at their trailing edges are removed. For example, the diaphragm 10 illustrated in FIG. 3 may be disposed on the rotary table with the trailing edges 24 in an upwardly facing orientation with the milling head cutting away the damaged trailing edge portions consistently and repeatedly from each partition. In FIG. 4, the extent of the partition which is to be removed by the milling head 30 is illustrated by the dashed lines 32. It will be appreciated that the length of the partition removed lies within a range preferably about 50–85% of the partition, e.g., as measured along a chord of the partition commencing with the trailing edge 24. The removal of the majority of the partition leaves a flat face 34 along the remaining leading edge portion 35 of the original partition 12. The removal of the metal can also be accomplished using a VBM and machining with a single point tool.

Figure 9:
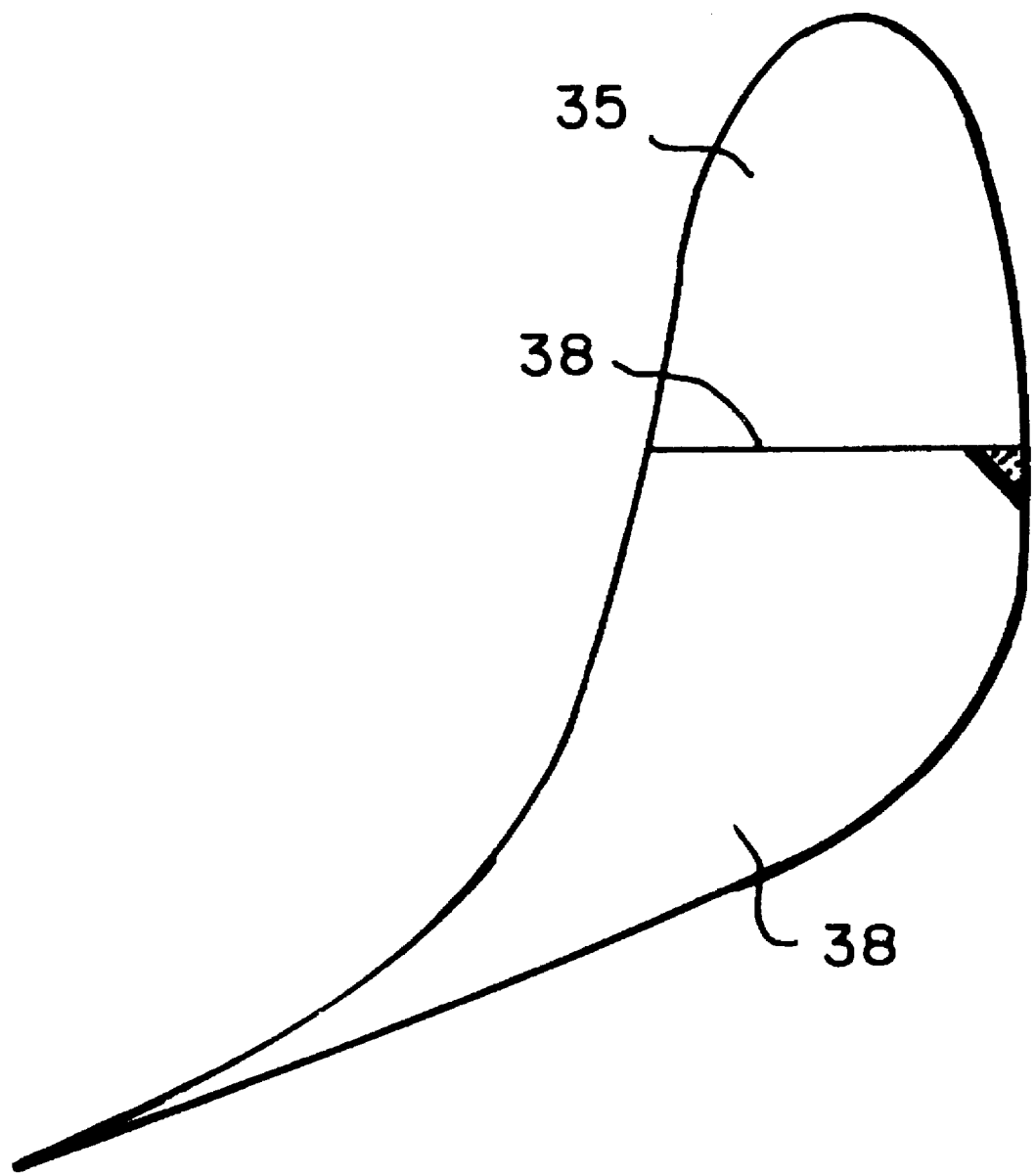
FIG. 9 is a cross-sectional view of a repaired partition particularly illustrating the joint between the original leading edge portion and the repair coupon.

The major portion of the original partition which is removed corresponds in length to the length of the coupon 36 illustrated in FIG. 5, e.g., as measured along a chord commencing at the trailing edge. The coupons 36 are precise replications of the original partitions as measured from their trailing edges, e.g., along their chords, to the cut faces 34, with the exception of the radial extent and end faces of the coupons as noted below. Thus, the contours of the coupons correspond identically to the original contours of the portions of the partitions which have now been removed (the coupons have a different radial length and end face configurations). Consequently, the coupon 36 has a flat forward or leading face 38 (FIGS. 5 and 9) as well as contours along pressure and suction sides corresponding to the contours of the portion of the original partition now removed. The radial inner and outer end faces 39 and 41 of the coupon 36 are tapered to provide a weld prep site. Additionally, the coupon is preferably formed having a radial extent short of the radial spacing between the inner and outer rings or sidewalls, thereby leaving ample space for full penetration welds at those locations between each coupon and the inner and outer rings or sidewalls. Further, each coupon 36 is provided with a chamfered surface 40 along the suction side of the coupon adjacent the flat surface 38. The chamfered surface 40 facilitates application of a seal weld upon installation of the coupon on the diaphragm. The coupon is formed preferably from a solid block of 410 stainless steel but may be formed of dissimilar materials with respect to the original partition. Other materials, for example, Inconel, can be used. Consequently, it will be appreciated that a coupon 36 which is a precise replication (with the exception of its radial extent and end face configuration) of a major portion of each original partition as measured from its trailing edge is provided for each partition.

To effect the repair, the eroded and damaged portions of the partitions are removed to the full designed depth as illustrated in FIG. 4 corresponding to the depth of each coupon. After their removal, the sidewalls or inner and outer rings of the diaphragm may then be repaired by applying weld material at any eroded or damaged locations. These peripheral surfaces may then be ground back or machined to its original specifications.

After the diaphragm has been preheated, e.g., to about 250° F., a coupon 36 is then placed in position with its flat face 38 bearing against the flat face 34 of the remaining leading edge portion 35 of the original partition as illustrated in FIG. 6 and clamped to the partition. A copper chill fixture, not shown, is disposed at each ring or sidewall. The coupons are then tack-welded at opposite ends to the rings or sidewalls using preferably a TIG weld. Thereafter, a seal weld is provided across the radial length of the partition on the suction side filling in the gap between the chamfered surface 40 and margin of the flat face 34 on the suction side. A chill fixture is then applied to the side wall and one end of the coupon and a full penetration weld, preferably with 410 stainless steel weld wire, is provided between a tapered end face of the coupon and the inner or outer ring or sidewall. After completing the full penetration weld on one sidewall or ring, a full penetration weld is also similarly provided at the opposite end of the coupon and the other ring or side wall. Excess weld material at the side walls is then ground to form smooth continuations of the pressure and suction sides of the repaired partition. The seal weld is likewise ground to provide a smooth surface at the joint along the suction side of the repaired partition. Additionally, the pressure side of the partition at the juncture of the coupon 36 and leading edge portion 35 is ground to effect a smooth transition.

It will be noted that the weld material is applied only at three locations to repair the partition. Two of those locations require full penetration welds and lie at the opposite ends of the coupon to fix the coupon to the inner and outer rings or side walls. The third application of weld material is to provide the seal weld along the suction side only of the repaired partition. The opposite side of the repaired partition at the joint between the remaining original partition portion 35 and the coupon 36 is not welded, nor is there weld material between the faces 34 and 38 of the original partition and coupon with the exception of the seal weld. The foregoing process is performed on each partition of the diaphragm with each partition being finished before repairing the next partition. Once all the partitions are repaired, various finishing procedures such as non-destructive examination, stress relief annealing and sand blasting may be performed to complete the repair.

It will thus be appreciated that the contours of the repaired partition on the pressure and suction sides are substantially identical to the contours of the original partition on the pressure and suction sides. The repair, however, has been effected with only two full penetration welds at the opposite ends of the coupon and one seal weld along the length of the partition. Distortion or twisting of the coupon during the repair is entirely eliminated because insufficient heat is transferred to the coupon during application of the seal weld to cause any distortion or twist. The weld material is also maintained at a minimum. Because the coupon extends over the majority of the length of the repaired partition and is a precise replication of that portion of the original partition including its suction and pressure surfaces, losses in performance due to the repair are substantially eliminated and the efficiencies of the repaired turbine are similar to those of the original turbine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A repaired partition of a turbine diaphragm comprising:
   a leading edge portion of an original partition extant in the turbine diaphragm and having a leading edge, a trailing face, and pressure and suction sides;
   a coupon replicating a trailing edge portion of said original partition for the turbine diaphragm, said coupon having a trailing edge, suction and pressure sides, a leading face and a length to said leading face extending from said trailing edge in excess of 50% of the length of said original partition;

said coupon being disposed in said diaphragm adjacent said leading edge portion with said leading face of said coupon lying in opposition to said trailing face of said leading edge portion and the pressure and suction sides of said leading edge portion forming substantial continuations of the respective pressure and suction sides of said coupon; and a seal weld between said coupon and said leading edge portion lying solely along one side of said repaired partition and extending between opposite ends of the repaired partition with no other weld material along an opposite side of the repaired partition.

2. A repaired partition according to claim 1 wherein said trailing face of said leading edge portion and said leading face of said coupon abut one another, said seal weld being formed along the suction side of the repaired partition.

3. A repaired partition according to claim 1 wherein said seal weld lies along a suction side of the repaired partition.

4. A repair partition of a turbine diaphragm comprising:

a leading edge portion of an original partition extant in the turbine diaphragm and having a leading edge, trailing face, and pressure and suction sides;

a coupon replicating a trailing edge portion of said original partition for the turbine diaphragm, said coupon having a trailing edge, suction and pressure sides, a leading face and a length extending from said trailing edge in excess of 50% of the length of said original partition to said leading face;

said coupon being disposed in said diaphragm adjacent said leading edge portion with said leading face of said coupon lying in opposition to said trailing face of said leading edge portion and the pressure and suction sides of said leading edge portion forming substantial continuations of the respective pressure and suction sides of said coupon; and a seal weld between said coupon and said leading edge portion lying along one side of said repaired partition and extending between opposite ends of the repaired partition;

said diaphragm having inner and outer wall portions, and full penetration welds at opposite end faces of said coupon joining said coupon to said inner and outer wall portions of the diaphragm, respectively.

5. A repair partition of a turbine diaphragm comprising:

a leading edge portion of an original partition extant in the turbine diaphragm and having a leading edge, trailing face, and pressure and suction sides;

a coupon replicating a trailing edge portion of said original partition for the turbine diaphragm, said coupon having a trailing edge, suction and pressure sides, a leading face and a length extending from said trailing edge in excess of 50% of the length of said original partition to said leading face;

said coupon being disposed in said diaphragm adjacent said leading edge portion with said leading face of said coupon lying in opposition to said trailing face of said leading edge portion and the pressure and suction sides of said leading edge portion forming substantial continuations of the respective pressure and suction sides of said coupon; and a seal weld between said coupon and said leading edge portion lying along one side of said repaired partition and extending between opposite ends of the repaired partition;

said trailing face of said leading edge portion and said leading face of said coupon abutting one another, said seal weld being formed along the suction side of the repaired partition;

said seal weld lying solely along one side of said repaired partition with no other weld material between said faces.

6. A repaired partition according to claim 5 wherein the pressure side of said repaired partition does not have weld material along the juncture of the abutting faces.

7. A repaired partition according to claim 6 in combination with said diaphragm, said diaphragm having inner and outer wall portions and full penetration welds at opposite ends of said coupon joining the coupon to said inner and outer wall portions of said diaphragm.

* * * * *